United States Patent Office 2,931,796
Patented Apr. 5, 1960

2,931,796

PROCESS FOR UP-GRADING NOVOBIOCIN

William H. De Vries, Kalamazoo, Mich., assignor to The Upjohn Company, Kalamazoo, Mich., a corporation of Michigan No Drawing. Application May 20, 1957
Serial No. 660,084

4 Claims. (Cl. 260—210)

This invention relates to a new process and is particularly directed to a process for the purification of novobiocin.

Novobiocin is a new antibiotic having the structural formula:

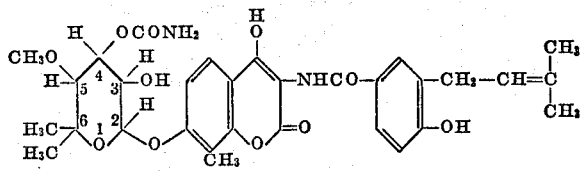

J. Am. Chem. Soc. 78, 1770–1 (1956); ibid. 78, 2019–20 (1956).

It has been shown that crude novobiocin crystals obtained from fermentation beer contain substantial quantities of an inactive component, more particularly so if the novobiocin has been brought into contact with alkali, especially at about pH 10, in the recovery process. This inactive component has been shown to be an isomer of novobiocin in which the carbamyl group is in the 3-position instead of the 4-position. This inactive isomer is known as isonovobiocin. Except for being biologically inactive, isonovobiocin has properties so similar to novobiocin that separation of the two isomers has been difficult.

It has now been found in accordance with this invention that novobiocin can be purified from admixture with isonovobiocin by treating the mixture with aqueous acetone containing acetone and water in the ratio of about 1.5 to one (parts by volume unless otherwise specified) and recovering crystals of novobiocin.

The process can be operated as a crystallization process in which the impure novobiocin is dissolved in the aqueous acetone and the solution cooled to cause crystallization. Alternatively it can be operated as a selective extraction process in which crystals of the impure novobiocin are washed with the aqueous acetone.

The latter procedure is advantageously used to upgrade the novobiocin crystals produced initially from the fermentation beer. In a suitable process the beer is extracted with butyl acetate and the novobiocin crystallized therefrom. In another process the butyl acetate extract is extracted with a buffered aqueous solution, advantageously, one buffered at about pH 10 with sodium carbonate and sodium bicarbonate, and the novobiocin crystallized therefrom, after neutralization to about pH 5.5, by the addition of acetone. Novobiocin crystals so obtained contain isonovobiocin as an impurity and can be upgraded by the process of this invention, advantageously, simply by washing the impure crystals with aqueous acetone in which acetone and water are present in the proportion of about 1.5 to one.

The ratio of acetone to water can be varied considerably but when the ratio is reversed or substantially increased, upgrading of the novobiocin is not obtained. Ordinarily a ratio of acetone to water of 1.5± twenty percent gives satisfactory results. Best results, however, have been so far obtained with a ratio of 1.5, i.e., with sixty percent aqueous acetone.

The amount of isonovobiocin present can vary considerably but ordinarily the isonovobiocin will be a minor constituent. Satisfactory results are obtained with mixtures containing more than about 1.5 parts novobiocin to one part of isonovobiocin. The amounts of isonovobiocin present can be determined by Craig countercurrent distribution analysis or by the difference between the U.V. assay and the bioassay. The former is more accurate but is too involved for general use. The latter shows the biologically inactive material that has the same ultra violet spectrum as novobiocin. Comparison with Craig analyses has shown that this material is essentially isonovobiocin. It is to be understood, however, that other inactive impurities may be present in this material. Whether or not they are present is immaterial to the invention because the same advantage is obtained in upgrading the novobiocin whether it is isonovobiocin or some other inactive material that is removed.

The invention can be more fully understood by reference to the following example which is given by way of illustration only.

Example

Crude novobiocin crystals obtained by extracting fermentation beer produced according to U.S. application 602,814 by extracting the beer with butyl acetate, extracting the butyl acetate extract with an aqueous sodium carbonate solution at a pH of about ten, and crystallizing at about pH 5.5 by addition of acetone, were washed first with 65 percent aqueous acetone (concentration increased to compensate for water in the crystals) and then with sixty percent aqueous acetone. In thirteen runs 408.6 kilograms of washed crystals were recovered having an average analysis of 86.3 percent novobiocin and 6.3 percent isonovobiocin, the former being determined by a bioassay (863 mcg./mg.) using *S. lutea* as the assay organism and the latter as the difference between the U.V. assay (926 mcg./mg.), which shows both novobiocin and isonovobiocin, and the bioassay (863 mcg./mg.). The washed crystals therefore contained 378 kilograms of novobiocin plus isonovobiocin, 352 kilograms of novobiocin, and 26 kilograms of isonovobiocin. The ratio of novobiocin to isonovobiocin is 13.5 to one (352/26). The wash liquors (269 gallons first wash; 202 gallons second wash), as determined in a like manner, assayed 6.2 kilograms of novobiocin and 13.9 kilograms of isonovobiocin. These data show a total of 358.2 (352 plus 6.2) kilograms of novobiocin and 39.9 (26 plus 13.9) kilograms of isonovobiocin. The ratio of novobiocin to isonovobiocin in the crystals treated therefore is nine to one (358.2/39.9). Thus by washing the crystals with sixty percent acetone, the ratio of novobiocin is upgraded from nine to one to 13.5 to one.

The product of this example can be recrystallized in the usual manner to remove other impurities with or without further washes with sixty percent acetone according to this invention.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

I claim:

1. A process for up-grading novobiocin crystals containing isonovobiocin which comprises: contacting said novobiocin crystals with aqueous acetone having a ratio of acetone to water from 1.8 to 1.2 and recovering crystals of novobiocin therefrom.

2. A process for up-grading novobiocin crystals containing isonovobiocin which comprises: washing said crystals with aqueous acetone having a ratio of acetone to water from 1.8 to 1.2.

3. The process of claim 2 in which the novobiocin crystals treated contain at least 1.5 parts of novobiocin for each part of isonovobiocin.

4. In a process in which novobiocin, containing isonovobiocin, is crystallized from an aqueous alkaline solution containing the same by acidifying the solution, adding acetone thereto to precipitate novobiocin crystals, and separating the novobiocin crystals therefrom, the improvement which comprises washing the separated crystals with aqueous acetone having a ratio of acetone to water from 1.82 to 1.2.

References Cited in the file of this patent

Jr. Am. Chem. Soc., December 1955, vol. 77, pp. 6404–5.

Hoeksema et al.: Antibiotics and Chemotherapy, vol. 6, February 1956, pp. 143–148.